United States Patent [19]

Crooks et al.

[11] 4,142,087
[45] Feb. 27, 1979

[54] WELDING GUN ADAPTED TO WELD FIXED CONTACTS ON WIRE SPRING RELAYS

[75] Inventors: Basil D. Crooks; R. Brian P. Bennett, both of Toronto, Canada

[73] Assignee: Northern Telecom Limited, Montreal, Canada

[21] Appl. No.: 797,307

[22] Filed: May 16, 1977

[51] Int. Cl.² .................. B23K 9/28; B23K 11/28
[52] U.S. Cl. .................... 219/90; 219/91.1; 219/103
[58] Field of Search ............. 219/78, 90, 86.21, 107, 219/103, 78.01, 78.02, 78.16, 91.1

[56] References Cited

U.S. PATENT DOCUMENTS

| | | | |
|---|---|---|---|
| 2,464,054 | 3/1949 | Panik | 219/90 |
| 2,651,701 | 9/1953 | Backen | 219/90 |
| 2,812,418 | 11/1957 | Allan et al. | 219/86.21 |
| 2,929,913 | 3/1960 | Miller | 219/86.21 |
| 3,371,184 | 2/1968 | Napoli | 219/103 |

FOREIGN PATENT DOCUMENTS 300162  2/1954  Switzerland ............... 219/90

Primary Examiner—Bruce A. Reynolds
Assistant Examiner—Keith E. George
Attorney, Agent, or Firm—Shlesinger, Arkwright, Garvey and Dinsmore

[57] ABSTRACT

A welding gun for wire spring relays has jaws designed to clamp the wire contact arm with the end of the wire on which the contact is to be welded projecting a predetermined amount through the jaws. Mechanism on the gun brings the contact against the clamped wire (to which it is to be welded) with a predetermined spring pressure, the mechanism increases the pressure between contact and wire by a consistent amount before initiating the welding operation.

3 Claims, 11 Drawing Figures

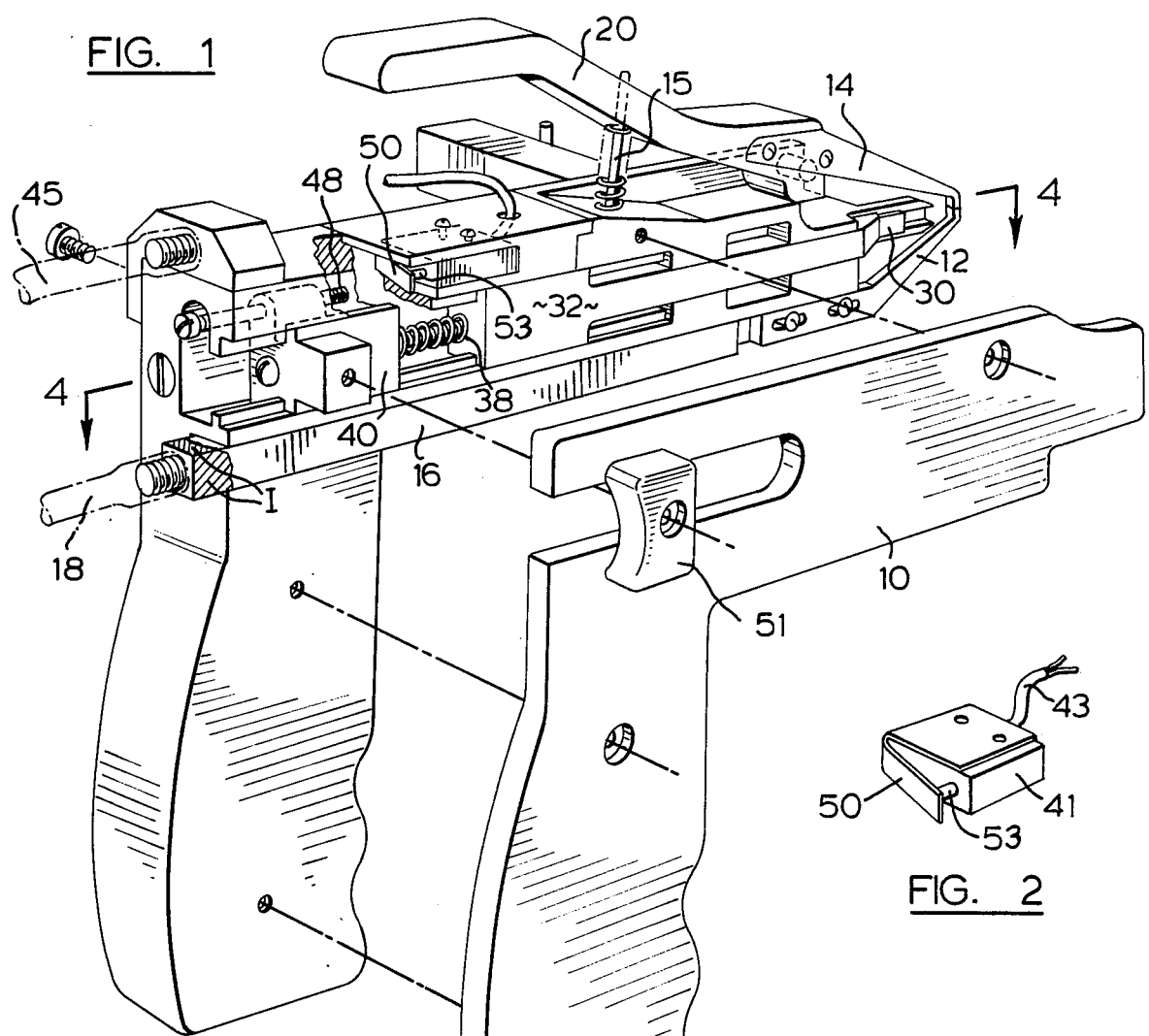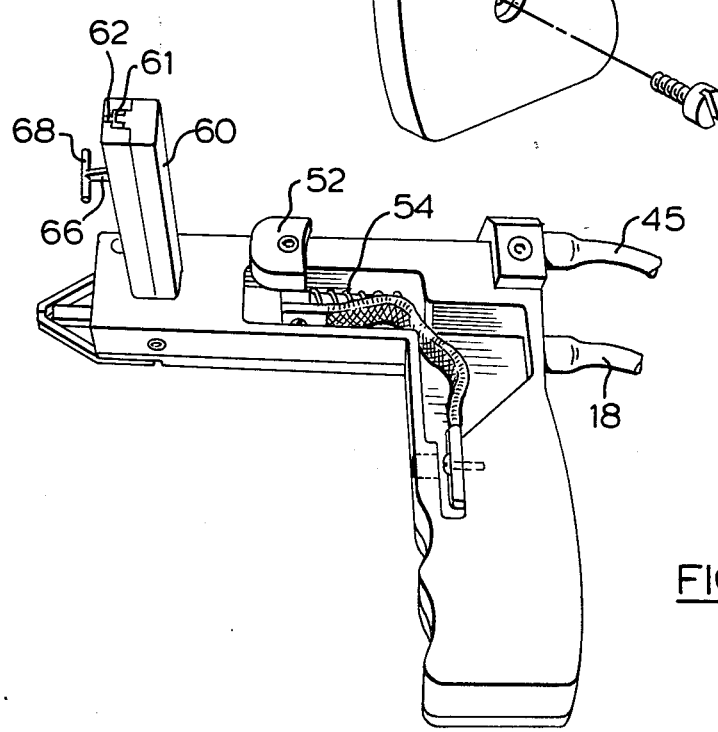

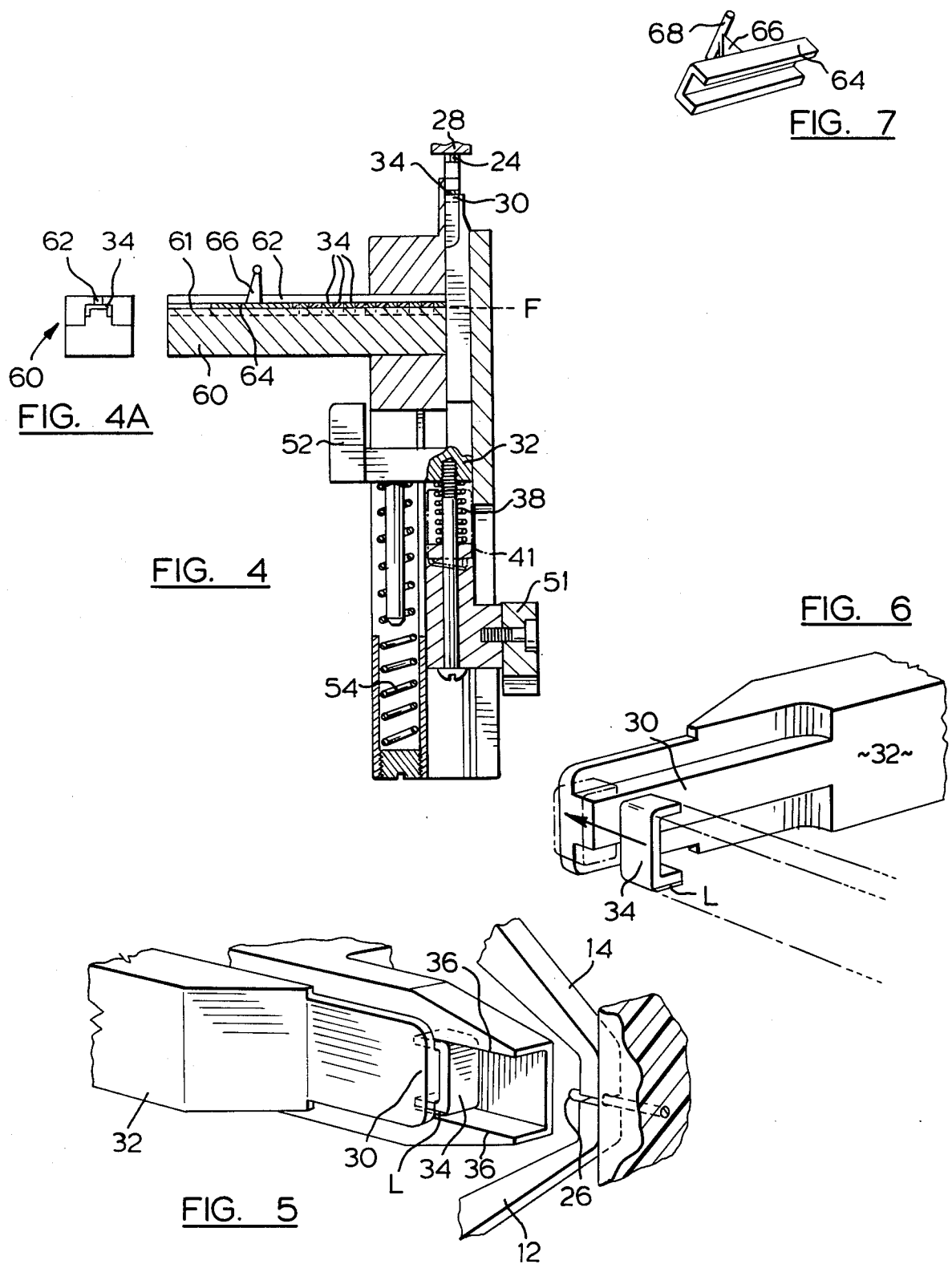

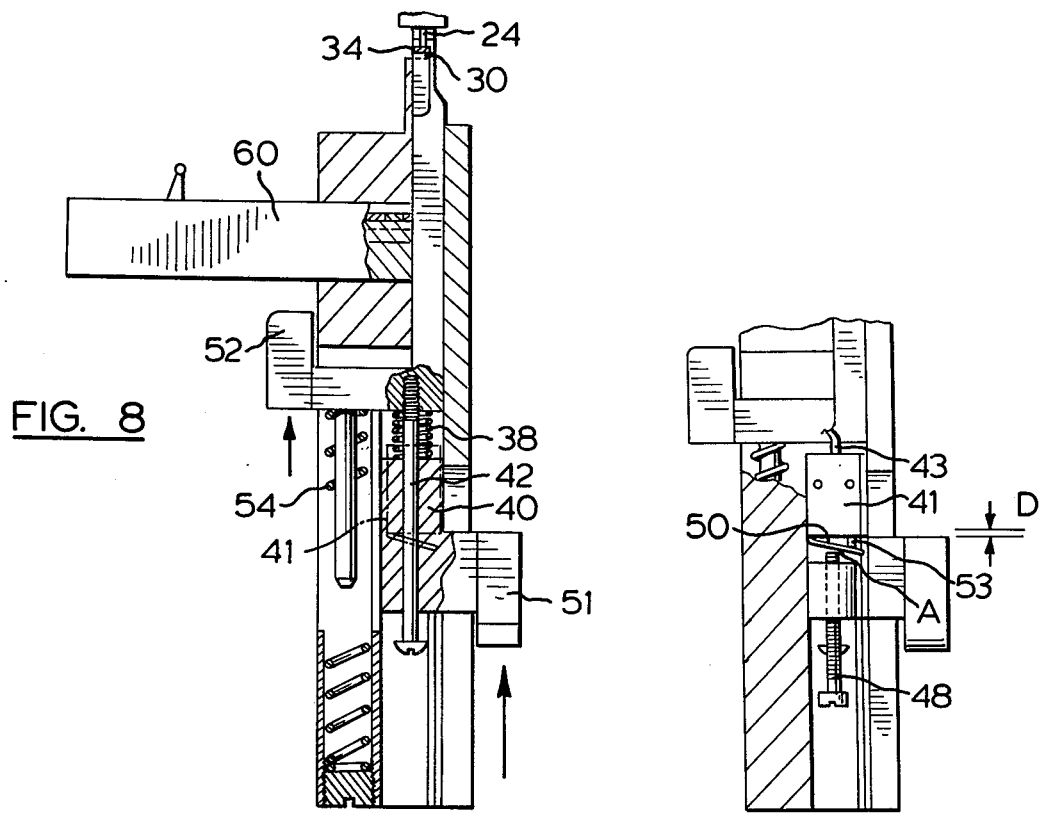
FIG. 8
FIG. 9
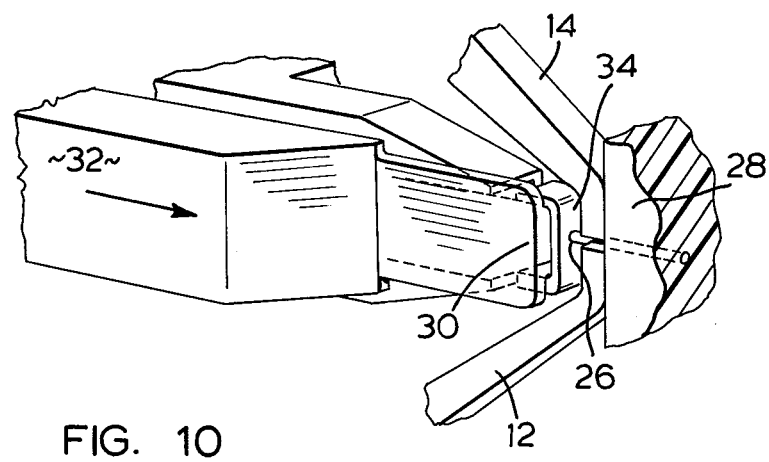
FIG. 10

WELDING GUN ADAPTED TO WELD FIXED CONTACTS ON WIRE SPRING RELAYS

This invention relates to a welding gun for welding a fixed contact on a wire spring relay.

The fixed contacts on a wire spring relay burn out under use and it is desireable to be able to replace such contacts in situ without withdrawing the relay from its location for use.

The object of the invention is to provide a welding gun having jaws designed to clamp the wire contact arm with the end thereof on which the contact is to be welded projecting a predetermined amount therebetween and to bring the relay contact, to be attached thereto, into pressure contact with the clamped wire end, for welding thereto, but to provide that the pressure is a consistent predetermined amount when the welding cycle is initiated.

In accord with the invention a pair of welding jaws are designed to move relative to one another to clamp the wire contact arm of a relay between them. The end of the arm projects a predetermined amount through the clamped jaws. A plunger carrying a fixed relay contact on the end is designed to move through a range of movement which will allow it to press such contact against the end of the relay arm so clamped. A manually operable member is provided whose movement is used to stress a spring and the spring is arranged to transfer such stress to motion of the plunger toward the clamped arm. Thus a predetermined amount of movement of the manually operable member causes the spring to move the plunger until the point is reached in the movement of the manually operable member where the contact is pressed against the wire end. The manually operable member is designed for movement through a further predetermined increment of movement after the above point is reached before operating a switch to cause the initiation of the welding operation. This increment of movement results in a predetermined amount of pressure being applied to press the contact against the arm end when the switch is operated to initiate the welding operation. Since the pressure exerted by the spring (and hence by the contact on the arm end) may be predetermined and is always the same at the point of application of the welding current, consistent results may be obtained with the welding gun in accord with the invention. It should be noted that the clamping pressure by the jaws on the spring arm is made sufficient that the spring arm does not move under the pressure of the contact thereon. It should also be noted that the gun is wired to provide (after actuation by the switch) welding current from one or both of the jaws through the relay arm, the contact and the plunger (or a conductor associated with the plunger).

FIG. 1 shows a perspective view of the gun with one side removed,

FIG. 2 shows a detail view of the micro switch;

FIG. 3 shows the gun from the opposite side to that in FIG. 1;

FIG. 4 shows a view along line 4—4 of FIG. 1 of the gun before manual actuation for welding;

FIG. 4A is an end view of the contact magazine;

FIG. 5 is an enlarged view of the jaws, the plunger and the contact for welding;

FIG. 6 is a perspective view showing the loading of a contact onto the plunger;

FIG. 7 is a detailed view of the slide member used to manually load the contact into the plunger path;

FIG. 8 is a view similar to FIG. 4 showing the gun manually actuated for welding;

FIG. 9 is a view from above with the parts in the position of FIG. 8;

FIG. 10 is a view similar to FIG. 5 but showing the same members in position for welding.

In FIG. 1 is shown the welding gun having a metal casing 10 mounting fixed jaw 12 and movable jaw 14. The fixed jaw 12 is mounted on square rod 16 which extends through the casing. The fixed jaw 12 is of conducting non-weldable material such as copper. A welding current lead 18 from a control, not shown, is attached to the rear of rod 16. In order to maintain the welding current path from lead 18 to jaw 12 insulated from the casing (which will preferably be metal) the square rod 16 is covered with an insulating skin preferably of plastic. This skin cannot conveniently be shown but is indicated by shadings I. The movable jaw 14 is mounted on the handle 20 which is pivotted to the casing at pin 22. The movable jaw 14 which is also of conducting, non weldable material is also insulated from the casing by constructing the handle 20 of plastic.

As best shown in FIGS. 5 and 10 the jaws 12 and 14 on their meeting faces are slightly recessed by grooves running in a direction longitudinally of the casing, to centre, between the jaws the wire relay contact arm 24 with the wire end 26 projecting from between the jaws toward the casing. The wire relay contact arms are of constant length and project from a plastic member 28. The amount of projection of the wire end 26 inwardly through the jaws is predetermined (in the preferred embodiment) by dimensioning the jaws so that when they are moved into contact with plastic member 28 and clamp the arm 24 the end 26 projects inwardly of the jaws the desired predetermined amount. This predetermined amount could be determined in other ways but the way shown seems most convenient.

A plunger 30 is mounted to be slidable in the casing, and attached to block 32 the direction of sliding being in a direction to carry a U shaped contact member 34 mounted with the cross-bar of the U across the end of the plunger into butt contact (see FIG. 10) with the wire end 26. Guides 36 attached to the casing extend on each side of plunger 30 to maintain the U shaped contact 34 on the plunger until a short distance before contact 34 contacts end 26 (Compare FIGS. 5 and 10).

A plunger block 32 is mounted to be slidable in the casing and a compression spring 38 bears forwardly on block 32 and rearwardly on manual actuating block 40. Manually actuating block 40 is also mounted to be slidable in the casing parallel to block 32 and plunger 30. A bolt 42 is attached to block 32 and pass through spring 38 and acts to centre it. The bolt 42 passes slidably through block 40. Thus (with a contact 34 on the end of plunger 30) actuation of manual actuating block 40 forwardly (i.e. toward the block 32 and the jaws) acts to compress spring 38 until block 32 is moved forwardly by the forward end of spring 38 causing the plunger 30 to carry a contact 34 toward the relay arm end 26. This motion continues until contact 34 is pressed (the pressure of spring 38) against relay arm end 26. The forward movement of block 40 is continued after the point where contact 34 is pressed against arm end 26, a predetermined distance D shown in FIG. 9. Over this distance the contact 34 and plunger 30 do not move because the contact 34 is bearing on wire end 26. Thus the further movement of block 40 over distance D causes predetermined further compression of spring 38 increasing the pressure of contact 34 on wire end 26. When block 34 has moved through the additional distance D it is caused to operate a switch (here a micro switch) 41 to initiate the welding operation. Operation of the switch 41 closes a circuit over wires 43 to a welding control (not shown) to supply current to weld the contact 34 to the end 26. The control determines the starting phase and the duration of welding current flow. The welding current flows from a lead 45, through the metal casing to strap 46 to block 32 and plunger 30 through contact 34 and end 26 to fixed jaw 12 rod 16 and lead 18. (The flow can equally be considered in the opposite direction). The lead 45 and the current path to contact 34 are in electrical contact with the casing. This can be so and the insulation of the path comprising rod 16 from the casing can be light because of the low voltages used. (preferably about 1½ volts).

Because the spring compression of the spring 38 before and after travel of block 40 over the distance D may be predetermined and is consistent, consistent pressures may be achieved between contact 34 and wire arm end 26 at the time the welding operation is initiated and performed.

Movable jaw 14 is spring biassed by spring 15 acting on handle 20 to apply the pressure to clamp wire relay arm 24 between jaw 14 and jaw 12. As generally explained previously the clamping pressure is made sufficient to retain wire arm 24 against movement when wire arm end 26 is being pressed by contact 34, plunger 30 and spring 38 at its maximum compression.

Physically the switching, after travel over the distance D is performed by block 40 by a micro switch 41 mounted on the casing to be contacted by a screw 48 mounted on block 40. In the particular embodiment a resilient spring strip 50 is provided overlying and movable to actuate the plunger of the microswitch when strip 50 is contacted by screw 48. This allows operation of the micro switch even though the screw 48 and the micro switch plunger are misaligned. It will be realized that the distance D is the sum of the spacing (if any) between the end of screw 48 and strip 50, shown at A in FIG. 9 plus the depression of the plunger 53 of the microswitch necessary to actuate it. After the welding operation the instrument is removed from the welded relay contact 34 by manual operation of handle 20 to open jaw 14. The means for retracting block 32 and plunger 30 and a preferred method of providing a supply of contacts 34 will now be described.

Block 40 has, on one side of the casing an actuator 51 to perform the operation just described. Block 32 is provided with a manual actuator 52 on the other side of the casing. Manual actuator 52 is pressed forwardly toward the jaws by compression spring 54 which has its rearward end bearing on the casing. FIG. 4 shows the position of the welding gun in the rest position, i.e. spring 54, uncompressed has block 32 at a point where contact 34 is spaced from arm end 26 (as shown in FIG. 4) and spring 38, uncompressed, is holding block 40 and actuator 51 at its rearmost position. The actuated position for welding contact 34 to end 26 is shown in FIG. 8. When the welding is completed actuator 51 is released and the members return to the position of FIG. 4. To load a further contact 34 on plunger 30 for the welding operation, actuator 52 is moved rearwardly until the plunger 30 is aligned to receive a contact 34 from the megazine 60 shown in FIG. 4. The position of the forward end of the plunger in FIG. 4 is indicated by line F. The magazine 60 is removably mounted on the gun (preferable by providing a close sliding fit in the casing as best shown in FIG. 4). The magazine 60, as best shown in FIG. 4 and 4a is preferably a two piece member formed to provide a longitudinally extending U shaped groove 61 to slidably receive the U shaped contacts 34 in an orientation to be presented to the path of plunger 34 and slide thereover for motion toward wire end 26. FIG. 6 shows a contact 34 ready to move from the solid line position in the magazine 60 (which is not shown in FIG. 6) to the dotted line position on the front of plunger 30. As indicated in FIGS. 4 and 4A a slot 62 connects the U shaped lot to the outside of the magazine and outwardly of the row of contacts 34 as U shaped 'pusher' member 64 is designed to slide in the U shaped slot 61 and push a contact 34 into position on plunger 30 when required. A toggle 66 is part of pusher member 64 and extends outwardly from member 64 through slot 62 to a digitally actuable handle 68 by which the pusher may be actuated to advance the contacts 34.

On the U shaped contact 34 an overlay preferably of palladium-silver alloy is provided on the outside of the upright of the U to form the actual contact surface. A contact 34 may have overlays on both sides or merely one. If on only one side, that side is thicker than the other, and of course must be applied in the right orientation on the relay arm. Where overlays on both sides are used the overlay is customarily gold and both U uprights are as thin as the thinner side shown in the drawings. The drawing shows a magazine for an overlay on one side the overlay being designated L (FIGS. 5 and 6). Thus the U shaped groove in the magazine is made thicker on the side corresponding to the overlay thus assuring the correct orientation of the relay contact on the plunger 30. Where contacts 34 with two overlays are used the two thin arms allow the contacts 34 to slide through the magazine 60 shown, maintained in position by the ridge 59 forming the inside wall of the U shaped groove. (in fact the two overlays are usually provided on a single strip extending around and attached to the outside of the U of the contact). The clearance between plunger 30 and guides 36 is made sufficient for a contact 34 with overlays on both U uprights. Thus the plunger 30 and guides 36 do not have to be changed or adjusted when one type of contact is substituted for another. The magazine 60 is located to present the inside of the U shaped contact to plunger 30 whichever type or orientation of contact is used.

I claim:
1. Means for welding a contact onto the wire arm of a relay, comprising:
  a casing,
  said casing mounting a pair of jaws designed to clamp the wire arm adjacent the end where the contact is to be attached, with the end of the wire projecting between the jaws and toward said casing a predetermined amount,
  a plunger slidable in said casing, and designed to carry a contact member on the end thereof,
  said plunger being located and oriented to move said contact member into contact with said wire end on predetermined movement of the plunger therewards,
  a mahually operable member slidable in the same direction as said plunger, a spring designed to be stressed by movement of said manually operable member in the direction of movement of said plunger towards said wire end, said spring being designed and arranged to exert pressure on said plunger in accord with the stress thereon, whereby movement of said manually operable member in said direction stresses said spring sufficiently to move said plunger therewith until said contact member is pressed against said wire end, and whereby movement of said manually operable member in said direction after said contact member is pressed against said wire end results in increased pressure through said spring of said contact member on said end, means, operable by movement of said manually operable member a predetermined amount in said direction after contact of said contact member with said wire end, for closing a circuit to initiate the welding operation, the clamping pressure exerted upon said wire by said jaws being sufficient to retain the wire under the pressure exerted thereon by said contact when said circuit is actuated.

2. Means for welding a contact onto the wire arm of a relay, comprising:

a casing, said casing mounting a pair of jaws designed to clamp the wire arm adjacent the end where the contact is to be attached, with the end of the wire projecting between the jaws and toward said casing a predetermined amount, a plunger, slidable in said casing, and designed to carry a contact member on the end thereof, said plunger being located and oriented to move said contact member into contact with said wire end on predetermined movement of the plunger theretowards, a manually operable member slidable in the same direction as said plunger, a compression spring designed to bear at one end on said plunger in a sense to move the plunger toward said jaws and to bear at the other end on said manually operable member, whereby movement of said manually operable member in said direction compresses said spring sufficiently to move said plunger therewith until said contact member is pressed against said wire end, and whereby movement of said manually operable member in said direction after said contact member is pressed against said wire end results in increased pressure due to compression of said spring of said contact member on said end, means operable by movement of said manually operable member a predetermined amount in said direction after contact of said contact member with said wire end, for closing a circuit to initiate the welding operation, the clamping pressure exerted upon said wire by said jaws being sufficient to retain the wire under the pressure exerted thereon by said contact member when said circuit is actuated.

3. Means for welding a contact onto the wire arm of a relay, comprising:

a casing, said casing mounting a pair of jaws designed to clamp the wire arm adjacent the end where the contact is to be attached, with the end of the wire projecting between the jaws and toward said casing a predetermined amount, a plunger slidable in said casing, and designed to carry a contact member on the end thereof, said plunger being located and oriented to move said contact member into contact with said wire end on predetermined movement of the plunger theretowards, a manually operable member movable through a predetermined range of movement, a spring designed to be stressed by movement of said manually operable member in one direction within said range of movement, said spring being designed and arranged on movement in said one direction to exert pressure on said plunger in accord with the stress exerted on the spring, whereby movement of said manually operable member in said direction stresses said spring sufficiently to move said plunger therewith until said contact member is pressed against said wire end, and whereby movement of said manually operable member in said direction after said contact member is pressed against said wire end results in increased pressure through said spring of said contact member on said end, means, operable by movement of said manually operable member a predetermined amount in said direction after contact between said contact member and said wire end, for closing a circuit to initiate the welding operation.

* * * * *